United States Patent [19]
Reindl

[11] 3,813,601
[45] May 28, 1974

[54] DIGITAL TRANSMISSION SYSTEM

[75] Inventor: Adole Reindl, Wayside, N.J.

[73] Assignee: The United States of America as represented by the Secretary of the Army, Washington, D.C.

[22] Filed: Mar. 29, 1973

[21] Appl. No.: 346,196

Related U.S. Application Data

[63] Continuation-in-part of Ser. No. 177,032, Sept. 1, 1971.

[52] U.S. Cl. .................................. 325/141, 328/151
[51] Int. Cl. .............................................. H04b 1/04
[58] Field of Search.......... 325/38 R, 141, 143, 161, 325/164; 328/150, 151; 332/9

[56] References Cited

UNITED STATES PATENTS 3,369,182 2/1968 Reindl................................. 325/141

*Primary Examiner*—Albert J. Mayer
*Attorney, Agent, or Firm*—Edward J. Kelly; Herbert Berl; Jeremiah G. Murray

[57] ABSTRACT

A digital transmission system which transmits quantized values of the extremal points of an analog wave. The system includes a PCM encoder and an extremal detector for generating n-bit binary coded representations of the input extremal voltages. During each clock period in which an extremal point is detected, m of the most significant PCM bits are transmitted along with a control bit to indicate that an extremal point was detected. Simultaneously the n-m least significant bits are stored in a first-in-first-out buffer. During clock periods in which an extremal point is not detected, a set of m bits are transmitted from the buffer along with a control bit which signifies that an extremal point was not detected in that clock period.

5 Claims, 1 Drawing Figure

PATENTED MAY 28 1974 3,813,601
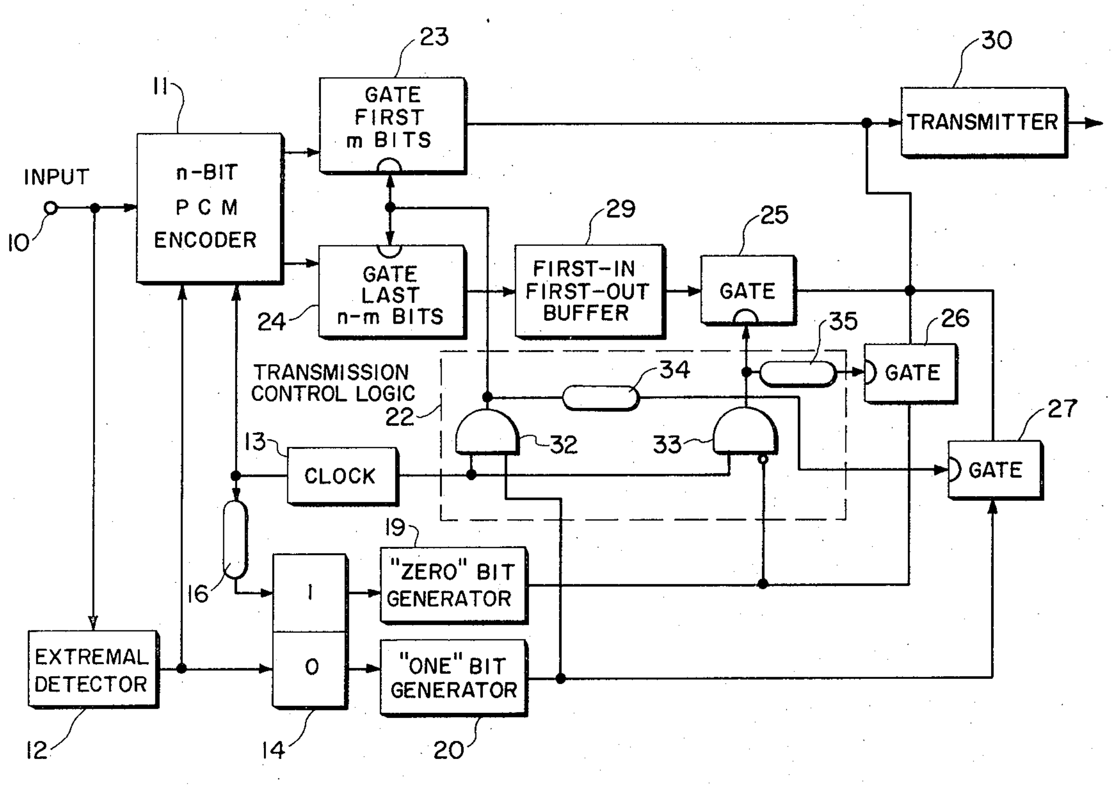

DIGITAL TRANSMISSION SYSTEM

This application is a continuation-in-part of application Ser. No. 177,032, filed Sept. 1, 1971 for Digital Transmission System.

The present invention relates to a system for transmitting digital signals and more particularly to a digital transmission system which optimizes the amount of intelligence transmitted for a given transmission bit rate and hence maximizes the transmission efficiency. The system involves the detection and transmission in digital format the extremal points of an analog wave. The receiving equipment reconstructs the analog signal by interpulating between the received extremal points. Analysis has shown that a speech wave with a 3000 cps upper frequency limit will contain 1500 to 2500 extreme points per second depending on the speakers voice characteristics. The maximum and minimum points of a 3000 cps sine wave are separated by 167 microseconds. This period of 167 microseconds determines the bit rate of the digital transmission system required for such a speech wave. For example, if pulse code modulation is utilized and the amplitude of each of the extremal samples is quantized into a four bit 16 level code, it will be necessary for the system to be capable of transmitting four binary bits within 167 microseconds or 24,000 bits per second. If each extremal sample is thus coded and transmitted as it occurs, the transmission bit rate will vary with the spectral of the speech signal, being 24,000 bits per second for the highest frequency of 3000 cps and proportionally lower for the lower frequency components thereof. Thus while the system must be designed to handle the maximum bit rate, it will be transmitting at this rate for only a small percentage of the time. This results in inefficient use of the system apparatus. In accordance with the principles of the present invention, the transmission system efficiency is improved by spreading out the transmission of the PCM bits over time periods in which no bits are normally transmitted. For example, the system transmits some predetermined number of the most significant bits from each of the codewords during each of the time periods in which an extremal sample has occurred and transmits the remaining bits during later time periods in which no extremal sample has occurred. If the total time lapse between periods in which no extremal sample has occurred is relatively long, then those bits which have been stored the longest during this period for later transmission are simply dropped and not transmitted. Therefore, the system will be transmitting at a substantially constant maximum bit rate and the predominant amount of information will be transmitted with the same accuracy and only slightly delayed. However, if the input information contains a high density of extremal points for a relatively long period of time, then the accuracy of the encoding of the extremal value samples will be reduced.

It is thus an object of the invention to provide an improved system of transmitting analog signals by pulse code modulation techniques.

A further object of the invention is to provide a system for transmitting extremal samples of an analog signal in a more efficient manner. These and other advantages of the invention will become apparent from the following detailed description and drawing which shows a block diagram of a preferred embodiment.

Referring now to the drawing, there is shown an input terminal 10 connected to the input of an $n$-bit PCM encoder 11 and an extremal detector 12. The $n$-bit PCM encoder has two control inputs one of which is connected to the output of extremal detector 12 and the other of which is connected to the output of clock 13. A flip-flop 14 has the reset side connected to the output of clock 13 via a time delay 16 and has the set side connected to the output of the extremal detector 12. The complimentary outputs of flip-flop 14 are connected to a "zero" bit generator 19 and a "one" bit generator 20, the outputs of which are connected to the input of a transmission control logic 22. Also connected to a transmission control logic 22 is an output from clock 13. The outputs of transmission control logic 22 are connected to the enable terminal of transmission gates 23, 24, 25, 26 and 27. Gate 23 is connected to one of the outputs of $n$-bit PCM encoder 11 for transmitting the $m$ most significant bits from the most recent codeword produced by encoder 11 each time an enable pulse is transmitted from logic 22. Gate 24 is connected to a second output of $n$-bit PCM encoder 11 for gating the remaining $n$-$m$ least significant bits of the codewords produced by encoder 11 when enabled by logic 22. The output of gate 24 is connected to the input of a first-in-first-out buffer 29 which stores the bits transmitted by gate 24. The outputs of gates 23, 25, 26 and 27 are all connected to the input of a transmitter 30 which transmits the binary bits in any well known manner.

The transmission control logic 22 determines what information is to be transmitted and in what order the transmission will be accomplished. Briefly, so long as the input signal contains extremal points only the $m$ most significant bits will be transmitted. When a clock period occurs which does not contain an extremal point, then the longest stored set of $m$ least significant bits will be transmitted. This will continue until an extremal point is again detected. This operation will now be described in detail.

When an extremal voltage appears on the input terminal 10, extremal detector 12 will send a control signal to $n$-bit PCM encoder 11 which will encode the extremal voltage into an $n$-bit codeword. The output of extremal detector 12 will also set flip-flop 14, which, in turn, will energize "one" bit generator 20. The transmission control logic 22 will have an output function such that when the "one" bit generator 20 is energized AND a clock pulse is received from clock 13, gate 27 will first be enabled so that a logical "one" may be transmitted from "one" bit generator 20 to the transmitter 30. The logical "one" will indicate that an extremal voltage has been detected in that particular clock period. After the logical "one" has been transmitted from "one" bit generator 20 to transmitter 30, transmission control logic 22 will then enable gates 23 and 24. At this time gate 23 will transmit the first m most significant PCM bits to transmitter 30. At the same time, gate 24 will be transmitting the $n$-$m$ least significant PCM bits from PCM encoder 11 to first-in-first-out buffer 29 where they are stored for later transmission.

The clock 13 will also reset flip-flop 14 after a slight delay as determined by delay 16. When the flip-flop 14 is reset, the "zero" bit generator 19 is energized. If by the time the next clock pulse from clock 13 is generated no extremal voltage on input terminal 10 has been detected by extremal detector 12, then the "zero" bit generator will remain energized and the transmission control logic 22 will receive input pulses from the output of "zero" bit generator 19 AND clock 13. In response to this combination of inputs, the transmission control logic 22 will first enable gate 26 which will transmit a logical "zero" from "zero" bit generator 19 to transmitter 30. This logical "zero" will indicate that in this particular time period, an extremal voltage has not been detected on input terminal 10. Following the enabling of gate 26, transmission control logic 22 will then enable gate 25 which will then transmit the longest stored set of *m* least significant bits from buffer 29 to transmitter 30. The first-in-first-out buffer 29 will have a capacity such that if more than some predetermined number of the *n-m* least significant bits have been stored therein, then the longest stored bits will be dumped and never transmitted. In those samples which have had the *n-m* least significant bits dumped at the transmitter, only the *m* most significant bits will be used at the receiver to reconstruct the signal. Only in rare cases will this be necessary and the only sacrifice will be a slight reduction in the accuracy of the transmission system.

Many implementations of transmission control logic 22 would be obvious to those skilled in the art. The combination of logic elements 32, 33, 34, 35 and 36 shown in the figure is an example of one obvious implementation of transmission control logic 22. AND gate 32 enables transmission gates 23 and 24 when a clock pulse from clock 13 AND a logical "one" from "one" bit generator 20 occur at the inputs thereof. The same output pulse from AND gate 32 that enables gates 23 and 24 also enables gate 27 after a time delay introduced by delay 34. Likewise, AND gate 33, having one input inverted by inverter 36, enables transmission gate 25 when a clock pulse from clock 13 appears at one input and when a logical "zero" is produced at the inverter 36 by the "zero" bit generator 19. Gate 26 is enabled by the output of AND gate 33 via delay 35 which introduces a time delay between the enabling of gates 25 and 26. Other logic combinations will also be obvious to those skilled in the art.

Implementations of "zero" bit generator 19 and "one" bit generator 20 is also within the skill of the art and depends mainly on the type of digital transmitter used for transmitter 30. If transmitter 30 is a simple telegraph, then generators 19 and 20, when energized by the output of flip-flop 14, must produce pulses of proper voltage and polarity to energize the telegraph. A pair of amplifiers, one inverting and the other non-inverting, are obvious implementations. Other types of pulse shapers would be used for other obvious situations.

An example of a transmitted stream of bits is as follows:

1 101 1 010 1 101 0 110 0 001 1 011.

The spacing between the bits has no timing significance but is merely provided to separate the control bits from the PCM bits. In this example *n* equals 6 and *m* equals 3. The first logical "one" in the above stream is a control bit which was generated in "one" bit generator 20 to indicate that in the first time period an extremal sample occurred. The three most significant bits of that extremal sample follow, i.e., the three most significant bits for the first extremal sample are 101. The next bit in the stream, i.e., the fifth bit, is the second control bit generated by "one" bit generator 20 and indicates that in the second time period an extrmal sample was again detected. The three most significant bits associated with the extremal voltage detected during that second time period are 010. The ninth bit in the bit stream is the third control bit which is again a logical "one" followed by the three most significant bits of the extremal sample detected during the third time period. During all of these three time periods, the three least significant bits were being stored in series in the first-in-first-out buffer 29. Now, the fourth and fifth time periods in the stream have control bits which are logical "zeros" which indicates that no extremal samples occurred in the fourth and fifth time periods. That is, the thirteenth and seventeenth bits in the bit stream are both logical "zeros" and are both control bits which were generated by "zero" bit generator 19. However, each of these logical "zero" control bits is followed by three PCM bits which are actually the three least significant bits associated with the three most significant bits transmitted in the first and second time periods, respectively. For example, the entire six-bit PCM codeword for the extremal sample detected in the first time period may be found in the bit stream at bit positions 2, 3, 4, 14, 15 and 16, i.e., the entire six bit PCM codeword for the first extremal sample is 101110. Likewise, the entire six bit PCM codeword for the extremal sample detected in the second time period is 010001. Finally, the last three PCM bits in the stream, i.e. 011, are the three most significant bits for the fourth extremal sample which actually occurred in the sixth time period, i.e., in the bit stream there is a total of six control bits, one for each time period, four of which are a logical "one," one for each extremal sample.

Of course, the receiver will not be able to reconstruct the first extremal voltage until all six bits are received, which means that there will be a delay created. However, in most cases, this delay will be insignificant. If, however, there is a limitation on the amount of delay, then the size of the buffer 29 may be designed such that when this delay is exceeded the longest stored bits therein are simply dumped. In this case the receiver will use only the three most significant bits to reconstruct the signal. Therefore, during periods when the input signal has a high density of extremal points, the transmission accuracy will be sacrificed.

Obviously many modifications and variations of the present invention are possible in the light of the above teachings. It is therefore to be understood, that within the scope of the appended claims, the invention may be practiced otherwise than as specifically described.

What is claimed is:

1. A digital transmission system for transmitting in digital format the extremal points of an analog input wave comprising: an input terminal means for receiving said analog input wave; extreme detector means connected to said input terminal means for detecting the occurrence of extremal points on said analog input wave; digital encoder means connected to said input terminal means and the output of said extremal detector means for encoding the amplitude of said extremal points into a digital word having a predetermined number of digital elements; transmitter means for transmitting digital signals; first-in-first-out buffer means for storing digital signals; clock means for generating a clock signal; and transmission control means connected to the output of said clock means and said extremal detector means and including gate means for gating a predetermined number of the most significant of said digital elements from said digital encoder means to said transmitter means and for gating the remaining ones of said digital elements to said buffer means during those clock periods in which an extremal point has been detected, and for gating a predetermined number of bits from the output of said buffer means to said transmitter means during those clock periods in which an extremal point has not been detected.

2. The device according to claim 1 and wherein said digital encoder means is a pulse code modulation binary encoder.

3. The device according to claim 2 and further including means connected to the output of said extremal detector means and said clock means for generating a binary control bit for each extremal point detected; and said transmission control means including gate means for gating said binary control bits to the input of said transmitter during those clock periods in which an extremal point has been detected.

4. The method of transmitting in digital format the extremal points of an analog wave comprising: sampling said input wave during successive time periods; encoding each of said extremal samples into a digital word having a predetermined number of digital elements; transmitting a predetermined number of the most significant elements of each said digital word and storing the remaining ones of said elements during those time periods in which an extremal sample occurred; and transmitting a predetermined number of the longest stored elements during those time periods in which an extremal sample did not occur.

5. The method according to claim 4 wherein said digital elements are binary bits.

* * * * *